Patented Oct. 29, 1946

2,410,084

UNITED STATES PATENT OFFICE 2,410,084

RECOVERY OF HEPARIN

Marvin H. Kuizenga, Kalamazoo, Mich., assignor to The Upjohn Company, Kalamazoo, Mich., a corporation of Michigan No Drawing. Application December 9, 1943, Serial No. 513,623

3 Claims. (Cl. 195—7)

This invention relates to the recovery of heparin from animal tissue and is particularly directed to such a recovery method embodying certain novel steps in the autolysis of the animal tissue.

The separation and recovery of heparin from animal tissue and particularly beef liver, muscle, and lung has long been practiced. The conventional procedure includes the autolysis of the tissue, extraction of the autolysate, enzymatic digestion of the extract, and precipitation and separation of the crude heparin. A representative method of operation is that described by A. F. Charles and D. A. Scott in a contribution from the Connaught Laboratories, University of Toronto, and published in the Trans. Royal Society of Canada, Sec. 5, 1934, pages 55–58. These authors set forth a method for processing beef lung in which the lung is minced and allowed to stand for 24 hours at room temperature to accomplish autolysis. The product is then extracted with a mixture of N/2 sodium hydroxide and saturated ammonium sulfate and filtered. The filtrate is adjusted to pH of 2.5 with concentrated sulfuric acid to precipitate heparin. The acid mixture is heated to 60° C., filtered and the precipitate recovered and washed with hot dilute aqueous acid. The washed precipitate is suspended in ethyl alcohol to remove fatty material and again filtered. The residual precipitate is dissolved in dilute aqueous alkali and subjected to enzymatic digestion with trypsin, xylene being added to prevent putrefaction. The digestion is allowed to proceed at 37° C. for approximately 36 hours with intermittent adjustment of the pH to about 8. The digestion mixture is then diluted with 95 per cent ethyl alcohol and made acid with hydrochloric acid. The mixture is allowed to stand for 24 hours and the precipitate separated from the liquid media and redissolved in dilute aqueous sodium hydroxide. This product is heated to 75° C. to inactivate the trypsin and is centrifuged to remove insoluble material. The heparin is then precipiated from solution with acetone and hydrochloric acid, separated, washed with 95 per cent ethyl alcohol, and air-dried at room temperature.

While the foregoing method has been productive of a fair grade of crude heparin, the low yields obtained as compared to the total heparin content of the animal tissue, makes desirable the provision of improved procedures. It is an object of the present invention to provide an improved method whereby substantially increased yields of heparin are recovered.

According to the present invention it has been discovered that the procedure as outlined above may be modified to obtain heparin in yields 100 per cent or more greater than those previously obtained. Such modification comprises mixing water with the finely subdivided animal tissue employed as a starting material, and thereafter heating the aqueous mixture to a somewhat elevated temperature for a short period of time before carrying out the conventional autolysis step. The exact amount of water employed is not critical and an improved result is obtained even with very small amounts. Optimum yields, however, have been obtained when the macerated, minced, or ground animal tissue is dispersed in at least 15 per cent by weight of water, and preferably with at least 25 per cent by weight of water. The temperature to which the aqueous mixture is heated prior to autolysis should be between about 30° and 50° C. and preferably at least 35° C. The time of heating to such elevated temperature varies somewhat with the temperature selected, the bulk of the material being processed, the state of subdivision of the animal tissue, and the amount of water present. About one-half hour has been found optimum for a reaction batch comprising 100 pounds of ground tissue and about 33 pounds of water. While a somewhat reduced or extended heating period may be employed, greatly prolonging this phase of the operation does not improve the ultimate yield of heparin and causes difficulty in the later separation steps. In general, a satisfactory starting material is obtained simply by coarse grinding of the animal tisssue.

The following example illustrates a preferred embodiment of the invention, but is not to be construed as limiting.

Example 100 pounds of frozen beef lung was ground and mixed with 35.2 pounds of water. The mixture was heated with stirring to 35° C. for 30 minutes, 400 milliliters of xylene added thereto to inhibit putrefaction, and allowed to stand for 24 hours at a temperature of between 20° and 25° C. The autolyzed material was then mixed with 45 liters of 0.75N sodium hydroxide and 7.6 liters of saturated ammonium sulfate, and heated at 55° C. for 2 hours. The temperature was then increased to 80° C. and the mixture filtered to obtain 90 liters of filtrate. This filtrate was acidified with sulfuric acid to pH 2.5 and the resulting precipitate collected in a super-centrifuge and suspended in ethyl alcohol to remove fatty material. The residual precipitate was then separated from the alcohol by filtration and dissolved in 4 liters of water and sufficient 2N sodium hydroxide to yield a solution having a pH of 8.5. 30 grams of trypsin (1:300) was then added and an enzymatic digestion carried out at 38° C. for a period of 60 hours. The pH of the digestion mixture was intermittently adjusted to between 8.0 and 8.5 throughout this period. The mixture was then diluted with 2 volumes of alcohol to precipitate the crude heparin. This precipitate was redissolved in dilute aqueous alkali, heated to 75° C. to inactivate residual trypsin, and the crude heparin reprecipitated by dilution with 2 volumes of acetone. The precipitate was recovered by filtration and air-dried to obtain the desired heparin product.

The foregoing procedure was carried out in a number of separate operations involving but slight modifications in the procedures of autolysis, extraction, and purification. The following table sets forth the weight in grams of crude heparin obtained in each such operation. The assay of the anti-coagulant activity of the various products obtained is given in terms of units, both per milligram and per total product.

Table I

| Weight of product in grams | Units per milligram | Total units |
|---|---|---|
| 102 | 8.3 | 846,600 |
| 87 | 10.0 | 870,000 |
| 86 | 12.0 | 1,032,000 |
| 65 | 13.0 | 845,000 |
| 35 | 20.0 | 700,000 |
| 66 | 13.0 | 858,000 |
| 71 | 12.0 | 852,000 |

In comparative determinations, 100 pound quantities of frozen lung were processed strictly in accordance with the procedure of Charles and Scott acknowledged above. Seven individual determinations gave yields of crude heparin averaging approximately 50 per cent of those obtained according to the modified method of the preceding example. These products contained only from 4.0 to 6.9 assay units per milligram. Thus the anti-coagulant activity of the material obtained according to the present procedure is more than twice that characterizing the products of the conventional method, figured either on the basis of units per milligram or total units per product. It also follows that the degree of purity of the heparin obtained by the more nearly complete autolysis of the present invention is much higher than that characterizing the crude heparin product as previously known.

While the foregoing example has been particularly directed to the invention as applied to the recovery of heparin from beef lung, it is to be understood that beef liver, beef muscle, and other animal tissue containing heparin in available form may similarly be processed to obtain increased yields of heparin in a more nearly pure and more active form than possible according to known procedures.

I claim:

1. In a method for the recovery of heparin from animal tissue containing the same, the steps of finely subdividing the animal tissue, heating the subdivided tissue in mixture with water to between about 30° and 50° C., maintaining the mixture at a temperature above 20° C. until autolysis is substantially completed and separating the crude heparin from the autolysate.

2. In a method for the recovery of heparin from animal tissue containing the same, the steps of finely subdividing the animal tissue, heating the subdivided tissue in mixture with at least one-sixth its weight of water to between about 30° and 50° C., maintaining the mixture at above 20° C. until autolysis is substantially completed, and separating the crude heparin from the autolysate.

3. In a method for the recovery of heparin from animal tissue containing the same, the steps of finely subdividing the animal tissue, heating the subdivided tissue in mixture with water to between about 30° and 50° C., maintaining the mixture at between 20° and 25° C. until autolysis is substantially completed, extracting the mixture with dilute aqueous alkali and ammonium sulfate, acidifying the extract to precipitate crude heparin, washing the precipitated heparin with alcohol to remove fatty material, redissolving the solid residue in aqueous alkali, digesting this solution with trypsin, precipitating heparin from the digestion mixture, redissolving the precipitated heparin in dilute aqueous alkali, heating the solution to inactivate residual trypsin, precipitating heparin with alcohol, and separating and drying the heparin.

MARVIN H. KUIZENGA.